(12) United States Patent
Osaki et al.

(10) Patent No.: US 7,379,275 B2
(45) Date of Patent: May 27, 2008

(54) MAGNETO-RESISTIVE HEAD HAVING A THERMALLY CONDUCTIVE LAYER

(75) Inventors: Hiroyuki Osaki, Miyagi (JP); Tetsuo Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 10/869,661

(22) Filed: Jun. 16, 2004

(65) Prior Publication Data

US 2004/0264063 A1 Dec. 30, 2004

(30) Foreign Application Priority Data

Jun. 27, 2003 (JP) ............................ P2003-184763

(51) Int. Cl.
*G11B 5/39* (2006.01)
*G11B 5/78* (2006.01)

(52) U.S. Cl. ...................................... 360/313; 360/134
(58) Field of Classification Search ................. 360/313, 360/134, 320
See application file for complete search history.

(56) References Cited

U.S. PATENT DOCUMENTS 4,552,799 A * 11/1985 Ryoke et al. ............... 428/194

FOREIGN PATENT DOCUMENTS

| JP | 61-294637 A | * | 12/1986 |
| JP | 63-096725 A | | 4/1988 |
| JP | 06-274830 A | | 9/1994 |
| JP | 2000-090417 A | | 3/2000 |
| JP | 2001-043517 A | | 2/2001 |
| JP | 2003-132521 A | | 5/2003 |

* cited by examiner

*Primary Examiner*—Jefferson Evans
(74) *Attorney, Agent, or Firm*—Robert J. Depke; Rockey, Depke & Lyons, LLC.

(57) ABSTRACT

A magneto-resistive head, a magnetic tape and a magnetic tape recording/reproducing system, which are capable of suppressing the formation of protrusions around a magneto-resistive element, thereby preventing the occurrence of such problems as spacing loss and tape damage, are provided. A thermally conductive member that is connected to the magneto-resistive element is formed of a material having a thermal conductivity greater than 20 W/m·K so as to efficiently release the heat generated when the magneto-resistive element is in use and suppress the rise in temperature around the magneto-resistive element. In addition, by selecting, for a lubricant layer formed on the surface of the magnetic tape, a material whose melting point is higher than the operating temperature of the magneto-resistive element, the lubricant layer is prevented from melting even when the magneto-resistive element is in use and when the temperature of the magnetic head thus rises.

5 Claims, 9 Drawing Sheets

R₁:ALIPHATIC ALKYL GROUP OR ALIPHATIC ALKENYL GROUP

R₂:ONE OF PHLOROALKYL GROUP, PHLOROALKENYL GROUP, ALIPHATIC ALKYL GROUP AND ALIPHATIC ALKENYL GROUP

MAGNETO-RESISTIVE HEAD HAVING A THERMALLY CONDUCTIVE LAYER

CROSS REFERENCES TO RELATED APPLICATIONS

The present invention claims priority to its priority document No. 2003-184763 filed in the Japanese Patent Office on Jun. 27, 2003, the entire contents of which being incorporated by reference herein.

BACKGROUND OF THE INVENTION

1. Field of the Invention

The present invention relates to magneto-resistive heads, magnetic tapes and magnetic tape recording/reproducing systems.

2. Description of the Related Art

In recent years, video tape recorders, audio tape recorders and data storage systems for computers have been known as magnetic recording/reproducing apparatuses that use magnetic tapes as recording media. It is desirable for these magnetic recording media to have their recording density increased so as to improve their storage capacity and data transfer rate. However, when the recording density of a magnetic recording medium is increased, magnetic signals from the magnetic recording medium become weaker, and it is difficult to detect reproduction signals sufficiently with conventional inductive magnetic heads that utilize electromagnetic induction.

As such, it is becoming popular to use magneto-resistive heads, which use a magneto-resistive element (hereinafter referred to as MR element) comprised of a soft magnetic film, and which have a higher reproductive sensitivity than inductive magnetic heads, for the reproduction of signals. Further, of the various types of magneto-resistive heads, so-called shielded magneto-resistive heads, in which an MR element is placed between magnetic shields comprised of a soft magnetic material and in which an end portion of the MR element is exposed through a surface that faces a magnetic recording medium, have the highest reproductive efficiency, and are suitable for increasing recording density.

FIG. 10 shows the structure of a rotary head magnetic recording/reproducing apparatus that uses a conventional magneto-resistive head, and is a partially enlarged perspective view showing the rotary head and its surroundings. In order to place a magnetic tape 2 in contact with a magnetic head 1, the magnetic tape 2 is made to slide along a rotary drum 3, a lead 4, and rotary guides 5. The magnetic tape 2 is designed in such a manner that the lower edge of the tape runs along the lead 4 of the rotary drum 3 so that the magnetic head 1 can trace tracks correctly. By having the magnetic head 1, which is a magneto-resistive head that uses an MR element, mounted on the rotary drum 3 and made to slide along the magnetic surface of the magnetic tape 2, magnetic data recorded on the magnetic tape 2 is read.

FIGS. 11A and 11B show the sliding surface of a conventional magneto-resistive head. FIG. 11A is a front view of the magnetic head 1, and FIG. 11B is an enlarged front view of the MR element of the magnetic head 1 and its surroundings. The magnetic head 1 is positioned at a head exposing section formed at a predetermined position in the rotary drum 3, and an MR element 8 is held in place with a guard member 10 and a protective layer 9. The magnetic head 1 has such a structure where the MR element 8 is held between shields 6 and 7 comprised of a soft magnetic material, and where the surroundings of the shields 6 and 7 and of the MR element 8 are covered with the protective layer 9.

One end surface of the MR element 8 is exposed through the surface of the rotary drum 3 that contacts the magnetic tape 2, and the magnetic tape 2, which runs by sliding along the lead 4 of the rotary drum 3, and the MR element 8 face each other across a very small gap.

SUMMARY OF THE INVENTION

When the magnetic head 1, which uses a magneto-resistive element, is used as a read head, magnetized signals on the magnetic tape 2 are read by applying a weak electric current to the MR element that has magneto-resistive effects and by measuring the change in resistance. In so doing, because a current flows through the MR element 8, the MR element 8 generates heat due to its electrical resistance.

Since it is strongly desired for magnetic recording media and magnetic recording/reproducing apparatuses to be made smaller or to have their storage capacity increased, it is desirable for the magnetic head 1 to be made smaller and to have its performance enhanced. As the MR element 8 used in the magnetic head 1 becomes smaller and its performance enhanced, the amount of heat generated by the MR element 8 during magnetic measurement becomes greater, and it would be expected for the temperature around the MR element 8 to tend to become higher.

A lubricant layer is formed on the surface of the magnetic tape 2 in order to reduce friction between itself and the rotary drum 3. However, as the MR element 8 becomes progressively smaller and its performance better, thereby resulting in greater heat generation, there is a risk that the temperature around the MR element 8 would become higher than the melting point of the lubricant layer.

In order to evaluate the effects of heat generation by the MR element 8 on the magnetic head 1 shown in FIG. 10 and FIGS. 11A and 11B, the lubricant that forms the lubricant layer was processed in powder form, adhered to the surface of the magnetic head 1, an electric current was applied to the MR element 8, and the surface state was then observed. It was confirmed that when a current flows through the MR element 8, the temperature around the MR element 8 exceeds the melting point of the lubricant layer, the lubricant melts on the surface of the magnetic head 1 to cause meniscus formation. The temperature of the MR element 8 at this point was 62° C. Further, the melting point of the lubricant layer turned out to be 60° C. The temperature of the MR element 8 when meniscus formation was confirmed and the melting point of the lubricant are shown in table 1 below.

TABLE 1

| TEMPERATURE OF MR ELEMENT (° C.) | MELTING POINT OF LUBRICANT (° C.) |
|---|---|
| 62 | 60 |

FIGS. 12A, 12B and 12C show how a molten lubricant layer adheres to the magnetic head 1 of the MR element. 8. FIG. 12A is a front view of the magnetic head 1 and its surroundings, FIG. 12B is an enlarged view of the MR element 8 and its surroundings, and FIG. 12C is a sectional view of the MR element 8 and its surroundings as seen from above. As abraded particles and dust collect on the meniscus of the molten lubricant layer, a protrusion 11 is formed, thereby possibly leading to occurrences of malfunctioning due to spacing loss, or of such problems as damaging the magnetic tape 2.

The present invention provides a magneto-resistive head, a magnetic tape and a magnetic tape recording/reproducing system in which the formation of protrusions in the proximity of the MR element is suppressed, thereby making it possible to prevent occurrences of such problems as spacing loss and the damaging of tapes, as well as to improve the durability of magnetic tapes and enhance their reliability.

A magneto-resistive head related to an embodiment of the present invention may be a magneto-resistive head, which uses a magneto-resistive element that measures a magnetic field through magneto-resistive effects, which includes a thermally conductive member having a thermal conductivity greater than 20 W/m·k, and in which the above-mentioned magneto-resistive element is positioned so as to be connected to the above-mentioned thermally conductive member.

By positioning the thermally conductive member having a thermal conductivity greater than 20 W/m·K so as to be connected to the magneto-resistive element, the heat generated by the magneto-resistive element when a current flows through the magneto-resistive element and the change in the magnetic field is measured through magneto-resistive effects can be released efficiently. By releasing the heat of the magneto-resistive element, the rise in temperature around the magneto-resistive element can be prevented, and the temperature around the magneto-resistive element can thus be kept below the melting point of the lubricant layer formed on the surface of magnetic tapes. By keeping the temperature around the magneto-resistive element lower than the melting point of the lubricant layer, the problem of meniscus formation on the surface of the magneto-resistive head caused by the melting of the lubricant layer can be prevented. Thus, since the formation of protrusions at the magneto-resistive element can be suppressed, the occurrence of such problems as spacing loss and tape damage can be prevented, the durability of magnetic tapes can be improved, and their reliability enhanced.

Either silicon nitride ceramics, aluminum nitride, or silicon carbide may be contained in the material that forms the thermally conductive member. In addition, by having the thermally conductive member serve as an insulating protective layer that sandwiches the magneto-resistive element, the protecting of the magneto-resistive element as well as the releasing of heat therefrom can be carried out effectively.

A magnetic tape according to an embodiment of the present invention may be a magnetic tape having a layered structure in which a magnetic layer is formed on a base film, and in which a lubricant layer for reducing friction is formed on the top-most layer of the layered structure, where the melting point of the above-mentioned lubricant layer is higher than the temperature of the magnetic head for measuring the magnetic field of the above-mentioned magnetic layer even when it is in operation.

By having the melting point of the lubricant layer on the surface of the magnetic tape be higher than the operating temperature of the magnetic head, the lubricant layer does not melt even when the temperature of the magnetic head rises, and therefore, it is possible to prevent meniscus formation where the lubricant layer adheres to the surface of the magnetic head. By thus preventing meniscus formation caused by the lubricant layer, it is possible to suppress the formation of undesirable protrusions on the surface of the magnetic head. Therefore, occurrences of such problems as spacing loss, tape damage and the like can be prevented, and it is possible to improve the durability of the magnetic tape and enhance reliability.

In addition, the magnetic head uses a magneto-resistive element that measures magnetic fields through magneto-resistive effects, and its operating temperature is defined as the temperature when a current is flowing through the magneto-resistive element. Even if the magneto-resistive element generates heat and the temperature around the magneto-resistive element rises when a current flows through the magneto-resistive element and changes in the magnetic field are measured through magneto-resistive effects, the problem of meniscus formation on the surface of the magneto-resistive head caused by the melting of the lubricant layer can be prevented.

The lubricant layer may contain perfluoro polyether. The magnetic layer may be one in which a magnetic material is deposited on a base film through evaporation.

A magnetic tape recording/reproducing system according to an embodiment of the present invention may be comprised of a magnetic tape and a magneto-resistive head where the magnetic tape has a layered structure in which a magnetic layer is formed on a base film and a lubricant layer for reducing friction is formed as the top-most layer, the magneto-resistive head uses, a magneto-resistive element that measures the magnetic field of the above-mentioned magnetic layer through magneto-resistive effects, and the melting point of the above-mentioned lubricant layer is higher than the operating temperature of the above-mentioned magneto-resistive head.

By keeping the temperature around the magneto-resistive element lower than the melting point of the lubricant layer, the problem of meniscus formation on the surface of the magneto-resistive head due to the melting of the lubricant layer can be prevented. Thus, since the formation of protrusions at the magneto-resistive element can be suppressed, such problems as spacing loss, tape damage and the like can be prevented, the durability of the magnetic tapes can be improved, and their reliability enhanced.

By positioning a thermally conductive member having a thermal conductivity greater than 20 W/m·K so as to be connected to the magneto-resistive element, the heat generated by the magneto-resistive element when a current flows through the magneto-resistive element and the change in magnetic field is measured through magneto-resistive effects can be released efficiently. By releasing the heat from the magneto-resistive element, the temperature around the magneto-resistive element can be prevented from rising, and therefore it is possible to keep the temperature around the magneto-resistive element below the melting point of the lubricant layer formed on the surface of the magnetic tape. The magnetic tape may be one in which the magnetic layer is formed by depositing a magnetic material on the base film through evaporation.

In addition, since the melting of the lubricant layer of the magnetic tape can be suppressed by providing a thermally conductive material having a thermal conductivity that is greater than 20 W/m·K and connecting it to the magneto-resistive element, and by making the melting point of the lubricant layer on the surface of the magnetic tape be higher than the operating temperature of the magnetic head, the current applied to the magneto-resistive element can be increased and the sensitivity of the magneto-resistive element thus improved.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 3A shows the overall configuration, whereas FIG. 3B shows the MR element and its surroundings enlarged;

FIG. 6A is an exploded perspective view illustrating the positioning of the magnetic head on the rotary drum, FIG. 6B is a front view illustrating the positional relationship between the magnetic head on the rotary drum and the magnetic tape, and FIG. 6C is an illustrative diagram showing the magnetic record pattern recorded on the magnetic layer of the magnetic tape;

FIG. 7A is a chemical formula showing the basic structure of the lubricant layer and FIG. 7B is a chemical formula showing a more detailed structure of the lubricant layer shown in FIG. 7A;

DESCRIPTION OF THE EMBODIMENT

Hereinafter, a magneto-resistive head, a magnetic tape and a magnetic tape recording/reproducing system to which the present invention is applied will be described in detail with reference to the drawings. It is to be noted that the present invention is by no means limited to the description to follow, and instead may be modified without departing from the scope and spirit of the present invention.

Figure 1:
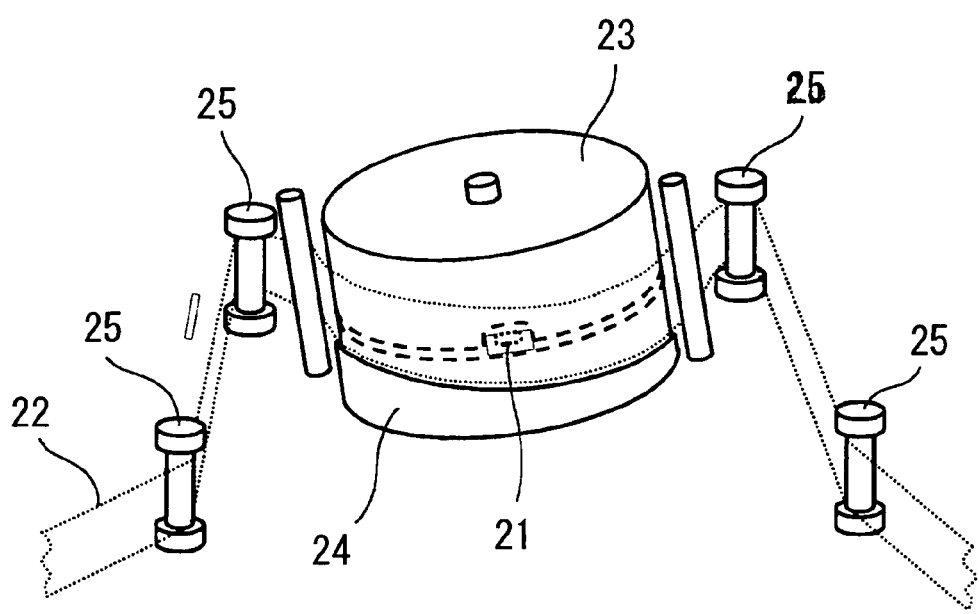
FIG. 1 is a perspective view showing the configuration of a magnetic tape recording/reproducing system according to an embodiment of the present invention.

FIG. 1 is an enlarged perspective view of a rotary drum and its surroundings in a magnetic tape recording/reproducing system related to the present invention. Magnetic data is read from a magnetic tape of the present invention by a magneto-resistive head of the present invention. A magnetic tape recording/reproducing system related to the present invention may have, in a similar way to a system in the related art, such a configuration in which, in order to place a magnetic tape 22 in contact with a magnetic head 21, the magnetic tape 22 is made to slide along a rotary drum 23, a lead 24 and rotating guides 25. The magnetic tape 22 is designed in such a manner that the lower edge of the tape runs along the lead 24 of the rotary drum 23 so that the magnetic head 21 can trace tracks correctly. By having the magnetic head 21, which is a magneto-resistive head that uses an MR (Magneto-Resistive) element, mounted on the rotary drum 23 and made to slide along the magnetic surface of the magnetic tape 22, magnetic data recorded on the magnetic tape 22 is read.

The magnetic head 21 is a component that reads data recorded on a magnetic layer of the magnetic tape 22 by having a weak current be applied to an MR element and measuring changes in the electrical resistance of the MR element utilizing magneto-resistive effects.

Figure 2:
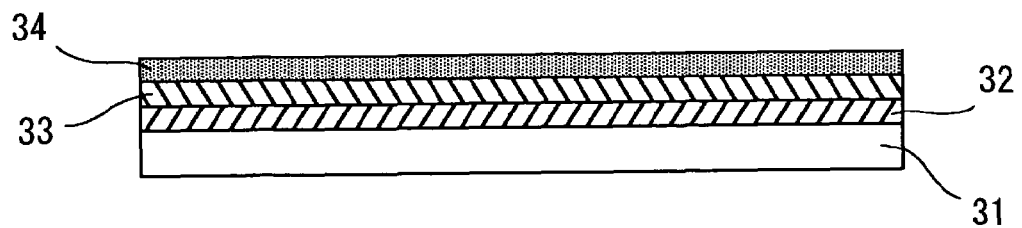
FIG. 2 is a sectional view showing the layered structure of a magnetic tape according to an embodiment of the present invention.

As shown in FIG. 2, the magnetic tape 22 has such a structure where a magnetic layer 32 is formed on a base film 31, which is a non-magnetic substrate of polyester film, polyamide or polyimide film or the like, by directly depositing a metal magnetic material, such as a Co—Ni alloy, a Co—Cr alloy, Co—O and the like, through vacuum deposition, sputtering, ion plating and the like, and a protective layer 33 and a lubricant layer 34 are formed on the magnetic layer 32.

The lubricant layer 34 is the layer that directly contacts the rotary drum 23, and is a layer for reducing the friction that is caused due to the running of the magnetic tape 22 and the rotation of the rotary drum 23. A material that has a melting point that is higher than the operating temperature of an MR element 28 is used for the lubricant layer 34 so that even when a current flows through the MR element 28 of the magnetic head 21 and heat is thus generated, the lubricant layer 34 does not melt at the temperature around the MR element 28 while the MR element 28 is operating. Materials that may be used for the lubricant layer 34 will be described later.

The rotary drum 23 is a cylindrical component on which are mounted a plurality of write heads and read heads for writing and reading, respectively, magnetic data with respect to the magnetic layer 32 of the magnetic tape 22. The rotary drum 23 rotates with the central axis of its cylindrical form as the center of rotation. The write heads and read heads are located on the same circumference along the side surface of the rotary drum 23, and as the rotary drum 23 rotates, each of the heads repeatedly contacts a magnetic tape sequentially. The direction of the rotational axis of the rotary drum 23 is not perpendicular to the direction in which the magnetic tape 22 travels, and instead a helical scan structure is adopted where the running of the magnetic tape 22 and the rotation of the rotary drum 23 result in the formation of diagonal record patterns on the surface of the magnetic tape 22.

The rotating guides 25 have a structure in which a cylindrical roller section is held between disc-shaped upper and lower flanges. The upper and lower flanges are fixed to the magnetic tape recording/reproducing apparatus, and the roller section is capable of rotating with the central axis of its cylinder as the center of rotation. The roller section has a uniform radius throughout, and may be made by performing a drawing process first and then giving a grinding finish, by a cutting process alone using a lathe, or by giving a grinding finish after being cut using a lathe. Stainless steel, aluminum alloys, ceramic materials, plastics and the like may be used for the rotating guides 25. Further, these materials may be coated with a thin film of ceramics or a metal.

Figure 3A:
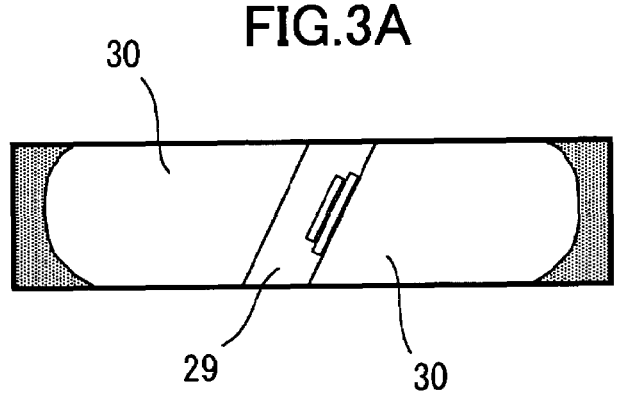
FIGS. 3A and 3B are sectional views showing the structure of a magneto-resistive head according to an embodiment of the present invention where
Figure 3B:
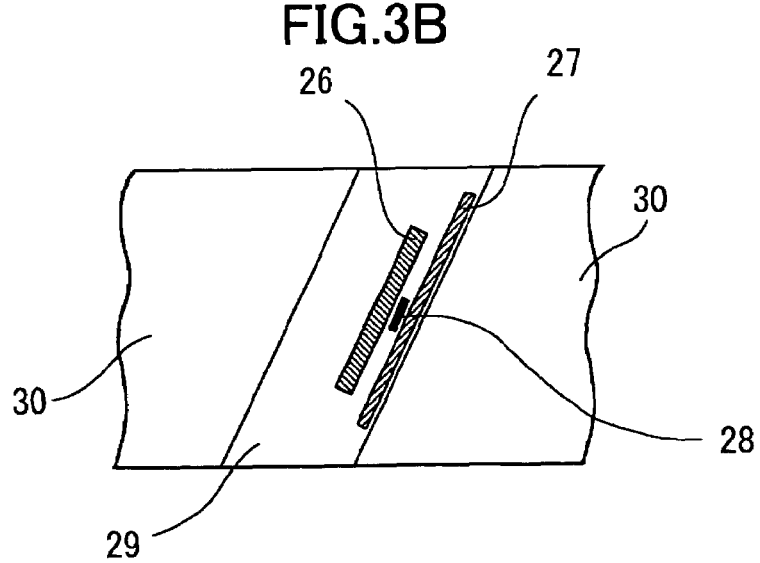

FIGS. 3A, 3B and 3C show the sliding surface of a magneto-resistive head related to the present invention. FIG. 3A is a front view of the magnetic head 21, and FIG. 3B is a front view in which the MR element of the magnetic head 21 and its surroundings are enlarged. The magnetic head 21 is positioned at a head exposing section formed at a predetermined position in the rotary drum 23, and the MR element 28 is fixed in place with a guard member 30 and a protective layer 29. The magnetic head 21 has such a structure where the MR element 28 is held between shields 26 and 27 comprised of a soft magnetic material, and where the areas around the shields 26, 27 and the MR element 28 are covered with the protective layer 29. One end surface of the MR element 28 is exposed through the surface of the rotary drum 23 that contacts the magnetic tape 22, and the magnetic tape 22, which runs along the lead 24 of the rotary drum 23, and the MR element 28 face each other across a very small gap.

The shields 26 and 27 are components that are so positioned as to hold the MR element 28 in-between and are formed of a soft magnetic material. They block the magnetic flux that is directed towards the MR element 28 from the side of the shields 26 and 27, and restricts the direction of magnetic fields measured by the MR element 28.

The MR element 28 is a device that has magneto-resistive effects, and as used herein, the term MR element will include devices that use such effects as MR (Magneto-Resistive), GMR (Giant Magneto-Resistive), TMR (Tunnel Magneto-Resistive) and the like. One end of the MR element 28 is turned to the direction of the side surface of the rotary drum 23, and reads magnetic bits recorded in the magnetic record pattern on the magnetic tape 22 that slides in contact with the rotary drum 23.

The protective layer 29 is filled around the shields 26 and 27 and the MR element 28, and it fixes the shields 26 and 27 and the MR element 28 while at the same time protecting them. The material used for the protective layer 29 should preferably have a high thermal conductivity so that the heat generated when a current flows through the MR element 28 may be released efficiently. Examples of such a material may include silicon nitride ceramics, aluminum nitride, silicon carbide and the like. Materials for the protective layer 29 will be described in detail later. The protective layer 29 is connected to the MR element 28 and functions as a thermally conductive member for releasing the heat from the MR element 28. This is an example where the protective layer 29 is directly connected to the MR element 28 as a thermally conductive member, but this need not be the case. So long as thermal conductivity is relatively high and releasing heat from the MR element 28 is possible, the thermally conductive member need not be the protective layer 29, and further, the thermally conductive member may be indirectly connected to or be positioned in close proximity to the MR element 28 via some other component.

The guard member 30 makes up the body of the magnetic head 21 and is a component for fixing the MR element 28 and the like to the rotary drum 23. Non-magnetic ceramics, for example, may be used for the guard member 30.

Figure 4:
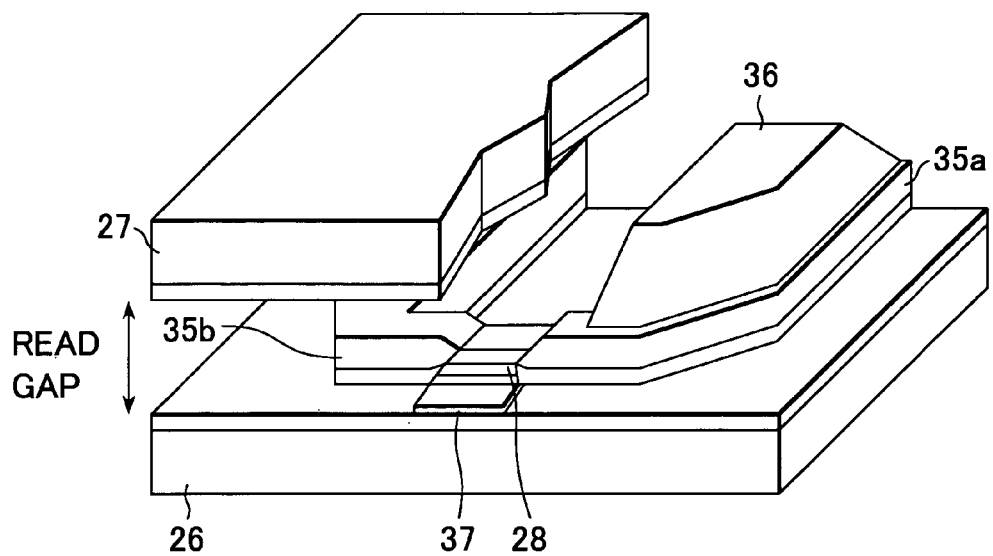
FIG. 4 is an exploded perspective view showing an example of the structure of an MR element used in an embodiment of a magneto-resistive head of the present invention.

FIG. 4 is a schematic view showing an example of the structure around the MR element 28. As described above, the MR element 28 is held between the shields 26 and 27. Electrode layers 35 and 36 for applying a current to the MR element 28 are formed between the shields 26 and 27. The electrode layer 35 is a metal layer that is so formed that it contacts two sides of the MR element 28, and by applying a voltage across electrode layers 35*a* and 35*b*, a current flows through the MR element 28, and due to the magneto-resistive effects of the MR element 28, the electrical resistance of the MR element 28 varies. The electrode layer 36 is a metal layer formed on the electrode layer 35, and although it is not in direct contact with the MR element 28, it has an effect of reducing electrical resistance due to the fact that the electrode layer 35 and the electrode layer 36 are layered together.

In addition, a magnetic flux introducing layer 37 formed of a ferromagnetic material is positioned so as to be connected to the surface of the MR element 28 that measures the magnetic flux, and the MR element 28 is so positioned as to be set back from the edge of the shields 26 and 27 by a distance equivalent to the length of the magnetic flux introducing layer 37. Since one of the sides of the magnetic flux introducing layer 37 is exposed at the edge of the shields 26 and 27 while another side is connected to the MR element 28, the magnetic flux introducing layer 37 serves to allow the magnetic flux on the side of the flux introducing layer 37 that is exposed at the edge of the shields 26 and 27 through to the MR element 28. By providing the magnetic flux introducing layer 37, the MR element 28 can be placed at a position that is set back from the edge of the shields 26 and 27, and thus it is possible to prevent the wearing of the MR element 28 caused by the sliding of the magnetic tape 22.

Figure 5:
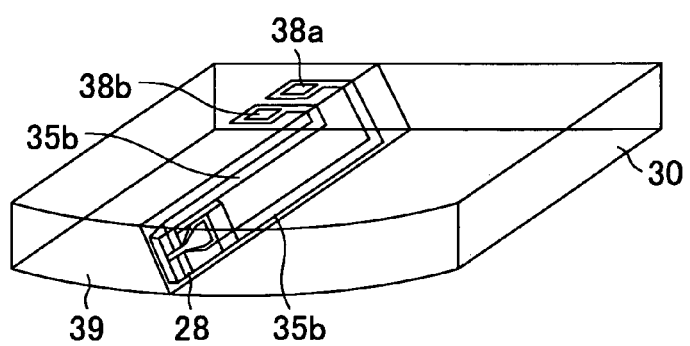
FIG. 5 is a transparent perspective view showing the structure of an embodiment of a magneto-resistive head of the present invention.

FIG. 5 is a transparent perspective view showing an example of the configuration of the magnetic head 21. The structure around the MR element 28 shown in FIG. 3 and FIG. 4 is fixed in place with the protective layer 29, and the shields 26 and 27 and the MR element 28 are positioned at azimuth angle θ within the plate-shaped guard member 30. The side surface of the guard member 30 on the side from which the MR element 28 is exposed forms a tape sliding surface 39 having a given curvature. The electrode layers 35*a* and 35*b* connected to the MR element 28 are formed so as to extend into the protective layer 29, and a portion thereof is drawn out to the surface of the guard member 30 to form electrode terminals 38*a* and 38*b*, respectively.

Figure 6A:
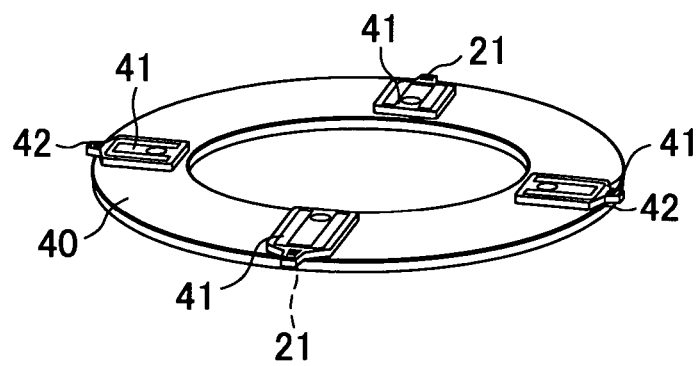
FIGS. 6A, 6B and 6C show the structure of a rotary drum used in an embodiment of a magnetic tape recording/reproducing system of the present invention where
Figure 6B:
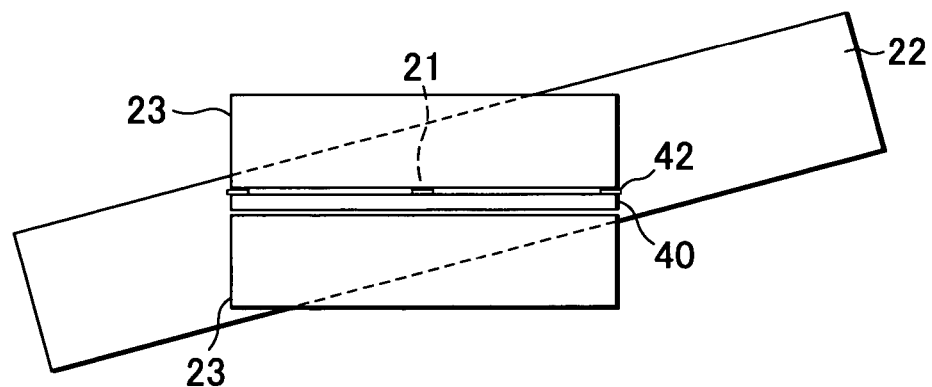
Figure 6C:
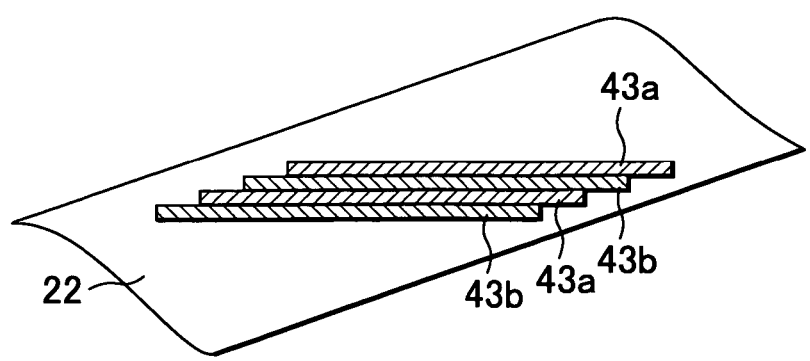

FIGS. 6A, 6B and 6C show the rotary drum 23 with a plurality of magnetic heads 21 arranged thereon. FIG. 6A is a perspective view showing the rotary drum 23 with a plurality of write heads and read heads arranged thereon. A plurality of head bases 41 are attached to a ring-shaped head mounter 40, which is part of the rotary drum 23, and the magnetic heads 21 shown in FIG. 5 or inductive heads 42 for recording are mounted on the head bases 41.

The head mounter 40 is a plate-shaped component that forms part of the cylindrical rotary drum 23, and the diameter of the rotary drum 23 and the diameter of the outer circumference of the head mounter 40 are the same. The head bases 41 are attached on the head mounter 40 at intervals of 90°-center-angles, and the magnetic heads 21 and the inductive heads 42 are mounted in order to connect the magnetic heads 21 and the inductive heads 42 electrically. This example involves the attachment of four head bases 41 on the head mounter 40, but the number of head bases 41 to be attached may be varied depending on the number of heads needed. The magnetic heads 21 and the inductive heads 42 mounted on the head bases 41 are provided on the outer circumference of the head mounter 40 in an exposed manner, and can directly contact the magnetic tape 22 at the side surface of the rotary drum 23.

The inductive head 42 functions as a write head for writing magnetic data on the magnetic layer 32 of the magnetic tape 22 through electromagnetic induction. In addition, the magnetic head 21 functions as a read head for reading magnetic data recorded on the magnetic layer 32 of the magnetic tape 22 utilizing magneto-resistive effects as described above. For the magnetic heads 21 and the inductive heads 42, a positive direction and a negative direction for the orientation of azimuth angle θ explained with reference to FIG. 5 are prepared with respect to the head mounter 40.

FIG. 6B is a front view showing the relationship between the rotary drum 23 and the magnetic tape 22. The head mounter 40 is positioned midway of the rotary drum 23, and the magnetic heads 21 and the inductive heads 42 are exposed through the side surface of the rotary drum 23. The magnetic tape 22 runs in an oblique direction relative to the central axis of rotation of the rotary drum 23, and the magnetic heads 21 and the inductive heads 42 slide across the surface of the magnetic tape 22 in an oblique direction while in contact therewith.

FIG. 6C is a diagram showing the magnetic record pattern recorded on the magnetic tape 22. As shown in FIG. 6B, because the magnetic heads 21 and the inductive heads 42 slide across the surface of the magnetic tape 22 in an oblique direction, magnetic record patterns 43 recorded on the magnetic layer 32 are formed in oblique stripes on the magnetic tape 22. In addition, magnetic record patterns 43a recorded with the inductive head 42 having a positive azimuth angle and magnetic record patterns 43b recorded with the inductive head 42 having a negative azimuth angle are alternately formed. In order to read data, the magnetic record patterns 43a are read with the magnetic head 21 having a positive azimuth angle, and the magnetic record patterns 43b are read with the magnetic head 21 having a negative azimuth angle.

Figure 12A:
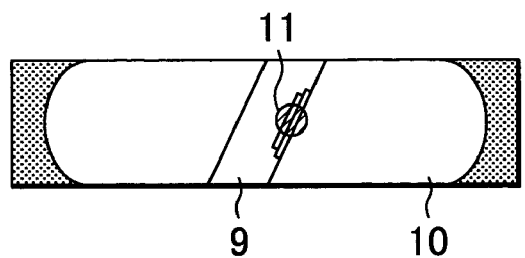
FIGS. 12A, 12B and 12C show a state where the lubricant layer of a magnetic tape has melted and meniscus formation has taken place on the surface of the magneto-resistive read head of a conventional magnetic tape recording/reproducing apparatus.
Figure 12B:
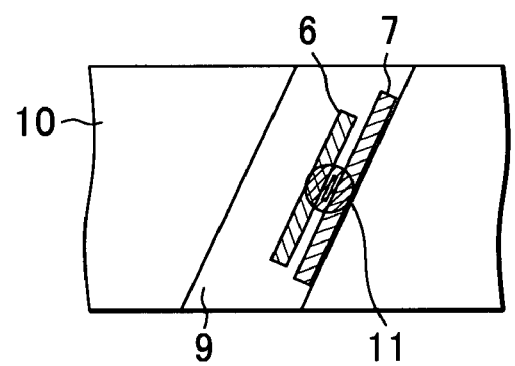
Figure 12C:
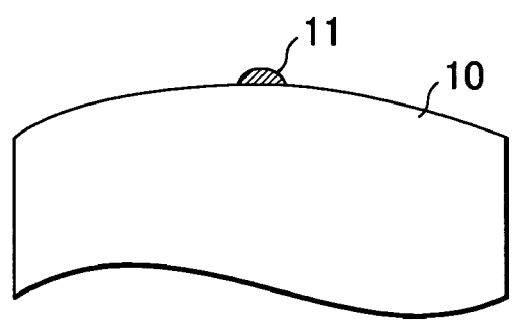

As described above, in a magnetic tape recording/reproducing system related to the present invention, magnetic data recorded on a magnetic tape related to the present invention may be read with a magneto-resistive head related to the present invention. In so doing, in the case of the magnetic head 21 that uses the MR element 28, a weak current of 10 mA or so is applied to the MR element 28 having magneto-resistive effects, and signals from the magnetic layer 32 of the magnetic tape 22 are read by measuring changes in the electrical resistance of the MR element 28. As described with reference to FIGS. 12A through 12C, because the MR element 28 generates heat when a current flows through the MR element 28, there may be cases where the operating temperature of the MR element 28 exceeds the melting point of the lubricant layer 34 formed on the surface of the magnetic tape 22, which may lead to occurrences of such problems as meniscus formation due to the melting of the lubricant layer 34.

With respect to a magnetic tape recording/reproducing system related to the present invention, in order to suppress the problem of meniscus formation caused by the melting of the lubricant layer 34 on the surface of the magnetic tape 22, it is necessary to keep the operating temperature of the MR element 28 below the melting point of the lubricant layer 34. Means for achieving the adjustment of the relationship between the operating temperature and the melting point may include the following: lowering the operating temperature of the MR element 28, or raising the melting point of the lubricant layer 34. The durability of the magnetic tape 22 will be evaluated for both cases, and descriptions on the materials used for the protective layer 29 of the magnetic head 21 and on the materials used for the lubricant layer 34 of the magnetic tape 22 will follow.

In order to make sure that the lubricant layer 34 does not melt to cause meniscus formation to take place on the surface of the magnetic head 21, the material used for the lubricant layer 34 must have a melting point that is higher than the temperature reached around the MR element 28 when a current is flowing through the MR element 28. However, it is also important that this material be able to reduce friction between the magnetic head 21 and the magnetic tape 22, which is one of the purposes the lubricant layer 34 is to serve.

Figure 7A:
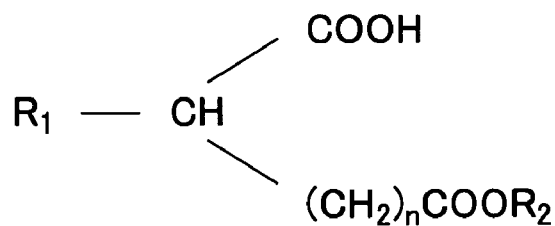
FIGS. 7A and 7B are chemical formulae showing an example of a lubricant layer, where
Figure 7B:
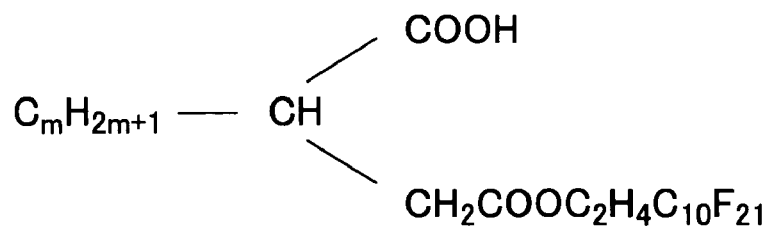

An example of a material that may be used for the lubricant layer 34 is perfluoro polyether. FIGS. 7A and 7B show chemical formulae of a material used for the lubricant layer 34, where FIG. 7A shows a chemical formula indicating the basic skeleton of the lubricant layer 34, and FIG. 7B is a chemical formula indicating specific examples of $R_1$ and $R_2$ in FIG. 7A. $R_1$ of the chemical formula for the lubricant layer 34 shown in FIG. 7A is an aliphatic alkyl group or an aliphatic alkenyl group, and $R_2$ is either a phloro alkyl group, a phloro alkenyl group, an aliphatic alkyl group, or an aliphatic alkenyl group. The material used for the lubricant layer 34 shown in FIG. 7B is such that n shown in FIG. 7A is 1 and $R_2$ is $CH_2COOC_2H_4C_{10}F_{21}$, and $R_1$ is assumed to be $C_mH_{2m+1}$. By changing the value of m in $C_mH_{2m+1}$ in the chemical formula shown in FIG. 7B, it is possible to vary the melting point.

In addition, the melting point of the lubricant layer 34 may be altered by varying the number of double bonds with respect to the chemical formula shown in FIG. 7A, or by varying the molecular length, for example. In addition, the melting points of $C_5F_{11}(CH_2)_{10}COOC_8H_{17}$, $C_6F_5CH=CH(CH_2)_{14}COOH$ and $C_5F_{11}(CH_2)_{10}COOH$ are shown in table 2 as examples of lubricant layer 34 having different structures. The melting point of $C_5F_{11}(CH_2)_{10}COOC_8H_{17}$ is approximately 20° C., the melting point of $C_6F_5CH_2CH=CH(CH_2)_{14}COOH$ is approximately 50° C., and the melting point of $C_5F_{11}(CH_2)_{10}COOH$ is approximately 80° C.

TABLE 2

| LUBRICANT | MELTING POINT (° C.) |
|---|---|
| $C_5F_{11}(CH_2)_{10}COOC_8H_{17}$ | 20 |
| $C_6F_5CH_2CH=CH(CH_2)_{14}COOH$ | 50 |
| $C_5F_{11}(CH_2)_{10}COOH$ | 80 |

Figure 8:
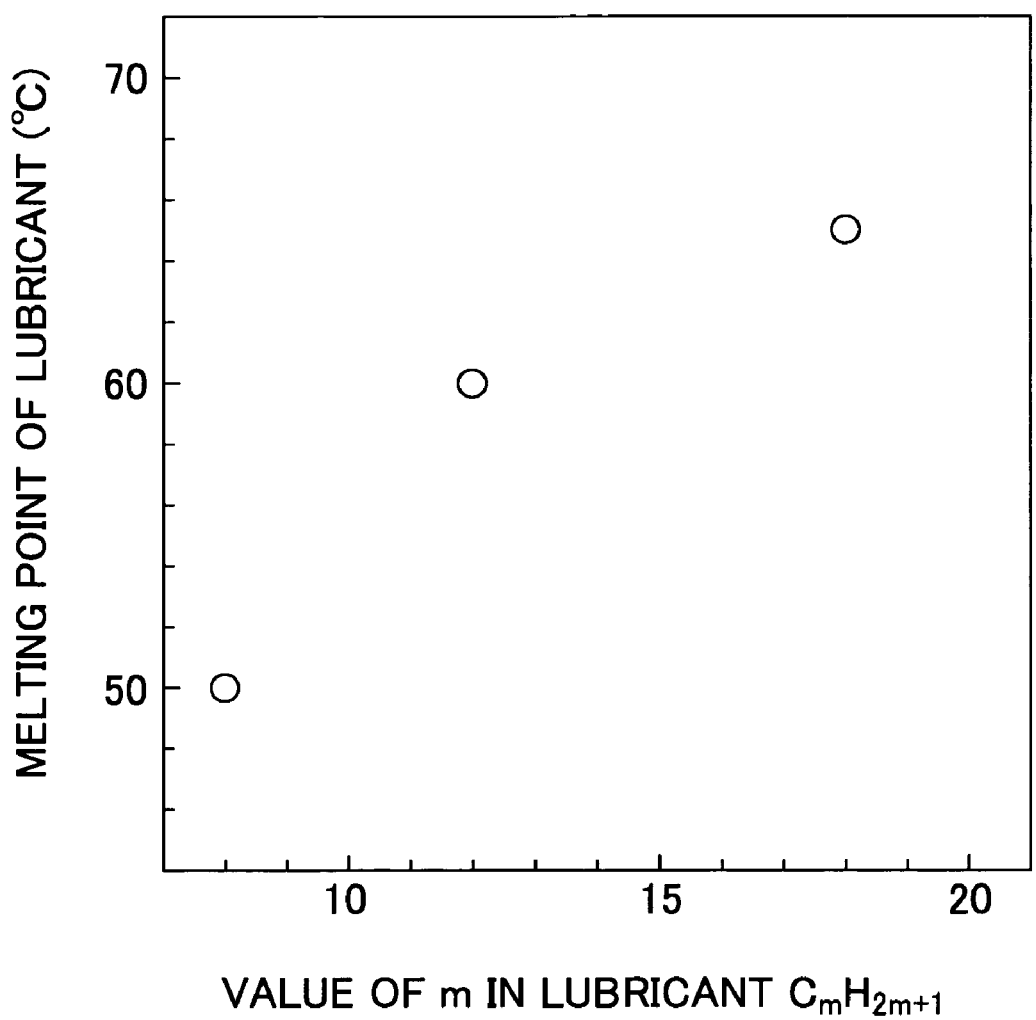
FIG. 8 is a graph illustrating the relationship between the value of m in the chemical formula for the lubricant layer shown in FIG. 7B and the melting point of the lubricant layer.

FIG. 8 is a graph showing how the melting point of the lubricant layer 34 varies as the value of m in $C_mH_{2m+1}$ in the lubricant layer 34 shown in FIG. 7B is varied. When m=8, the melting point of the lubricant layer 34 is approximately 50° C. At m=12, the melting point of the lubricant layer 34 is approximately 60° C. And at m=18, the melting point of the lubricant layer 34 is approximately 65° C.

By measuring the operating temperature of the magnetic head 21 in advance and selecting the material for the lubricant layer 34 to be formed on the surface of the magnetic tape 22 such that the melting point of the lubricant layer 34 is higher than the operating temperature around the MR element 28, theoretically, the lubricant layer 34 should not melt even if the temperature of the magnetic head 21 rises, and it should be possible to prevent meniscus formation where the lubricant layer 34 adheres to the surface of the magnetic head 21.

In addition, in order to prevent meniscus formation at the surface of the magnetic head 21 caused by the melting of the lubricant layer 34, it is preferable that the material used for the protective layer 29 formed in connection with the MR element 28 have a high thermal conductivity so as to release the heat generated by the MR element 28 efficiently.

For the protective layer of a magneto-resistive read head, it has been conventional to use alumina. However, the thermal conductivity of alumina is approximately 20 to 30 W/(m·K), which is not particularly high. As such, in order to lower the operating temperature of the MR element 28, silicon nitride ceramics, aluminum nitride, silicon carbide or the like, all of whose thermal conductivity is higher than that of alumina, is used as the material for the protective layer 29 to be provided around the MR element 28.

The thermal conductivity of the various materials of the protective layer 29 mentioned above are shown in table 3. The thermal conductivity of alumina, which is used conventionally, is approximately 20 W/(m·K). The thermal conductivity of silicon nitride ceramics is approximately 100 W/(m·K). The thermal conductivity of aluminum nitride is approximately 170 W/(m·K). And the thermal conductivity of silicon carbide is approximately 260 W/(m·K).

TABLE 3

| MATERIAL OF PROTECTIVE LAYER | THERMAL CONDUCTIVITY (W/(m · K)) |
|---|---|
| Alumina | 20 |
| Silicon Nitride Ceramics | 100 |
| Aluminum Nitride | 170 |
| Silicon Carbide | 260 |

In addition, the operating temperature of the magnetic head 21 may be lowered by changing the material of the MR element 28, or through the use of a cooling mechanism in which the circulation of air caused by the rotation of the drum is directed towards the head sliding surface, for example.

As described above, in these examples of a magneto-resistive head, a magnetic tape and a magnetic tape recording/reproducing system related to the present invention, the materials of the lubricant layer 34 and the protective layer 29 connected to the MR element 28 are selected so that the operating temperature of the MR element 28 would be lower than the melting point of the lubricant layer 34 used in the magnetic tape. 22.

Magneto-resistive heads, magnetic tapes, and magnetic tape recording/reproducing systems were created using the lubricant layer 34 and the protective layer 29 shown in FIGS. 7A, 7B and 8 and tables 2 and 3, and durability tests were carried out on the magnetic tape 22. In these durability tests, the magnetic tape 22 was held stationary, the rotary drum 23 was repeatedly slid over the same spot on the surface of the lubricant layer 34 of the magnetic tape 22, and if the time taken for the reproduced output to decrease by 3 dB was longer than 60 minutes, the durability of the magnetic tape 22 was evaluated as good, whereas if the time taken for the reproduced output to decrease by 3 dB was 60 minutes or shorter, the durability of the magnetic tape 22 was evaluated as bad.

Figure 9:
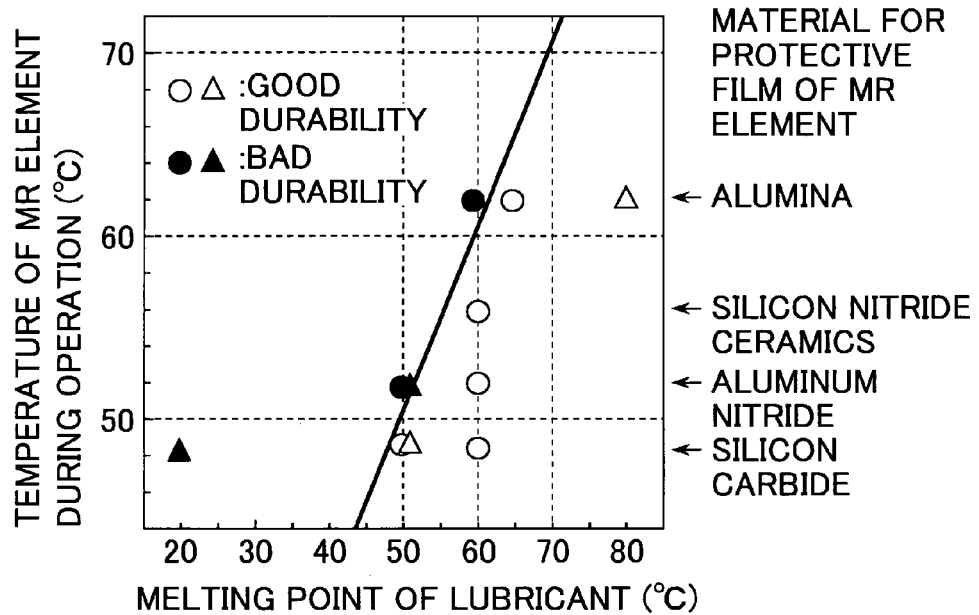
FIG. 9 is a graph illustrating the relationship between the melting point of the lubricant layer and the temperature of the MR element during operation in an embodiment of the present invention, and shows the results of a durability test for magnetic tapes.
Figure 10:
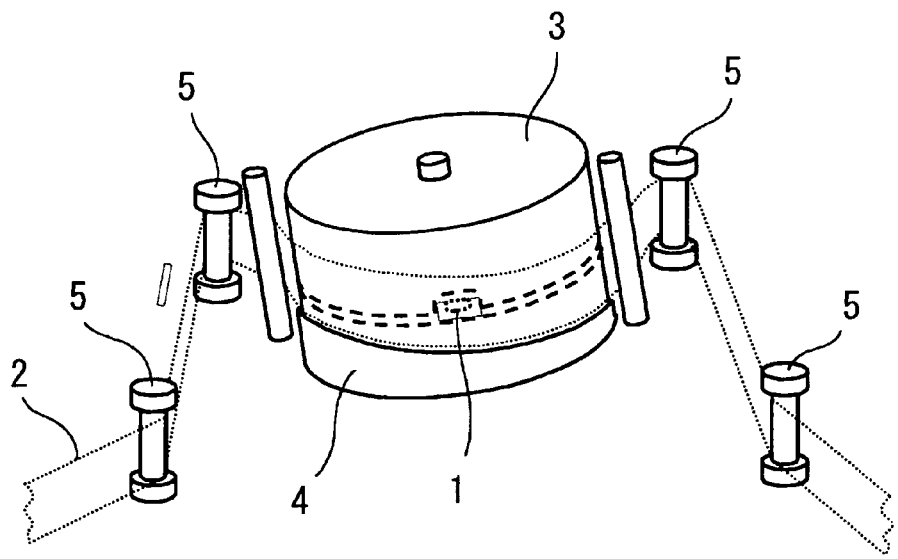
FIG. 10 shows the configuration of the head and the tape of a conventional magnetic tape recording/reproducing apparatus.
Figure 11A:
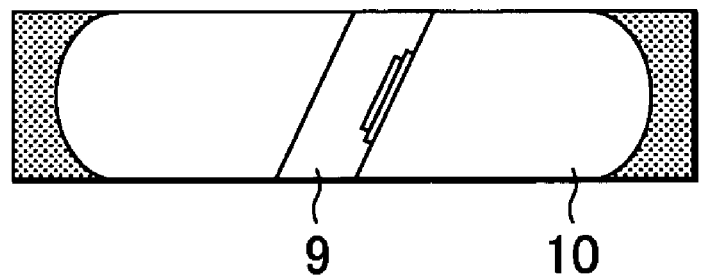
FIGS. 11A and 11B show the structure around the magneto-resistive read head of a conventional magnetic tape recording/reproducing apparatus.
Figure 11B:
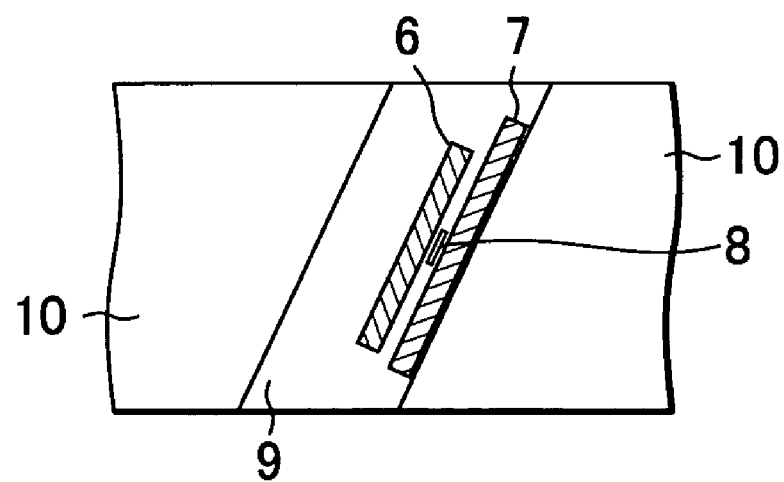

The results of the durability tests in which the materials of the lubricant layer 34 and the protective layer 29 were changed are shown in FIG. 9. The vertical axis represents the operating temperature of the MR element 28, and the horizontal axis represents the melting point of the lubricant layer 34. In addition, results for the lubricant layer 34 introduced in FIGS. 7A, 7B and 8 are indicated with circles, while results for the lubricant layer 34 introduced in table 3 are indicated with triangles. White circles or triangles represent results of the durability tests that were favorable, whereas black circles or triangles represent undesirable results.

In addition, cases where the protective layer 29 that is connected to the MR element 28 was formed using the materials shown in table 3 are indicated in the diagram. In the drawing, the results plotted at 62° C., 56° C., 52° C. and 49° C. with respect to the vertical axis represent cases where alumina, silicon nitride ceramics, aluminum nitride and silicon carbide were used, respectively, for the protective layer 29. From these results, it can be seen that by using materials that are more thermally conductive, the temperature reached by the MR element becomes lower.

The shaded area in the diagram represents points where the operating temperature of the MR element 28 is lower than the melting point of the lubricant layer 34, and it can be seen that when the operating temperature of the MR element 28 is lower than the melting point of the lubricant layer 34, the results of the durability tests are favorable. Therefore, one can see that regardless of the chemical formula of the lubricant layer 34 or of the material of the protective layer 29, durability is better in the area where the operating temperature of the MR element 28 is lower than the melting point of the lubricant layer 34.

In addition, by keeping the operating temperature of the MR element 28 lower than the melting point of the lubricant layer 34, meniscus formation caused by the melting of the lubricant layer 34 can be prevented, and the formation of undesirable protrusions on the surface of the magnetic head 21 can thus be suppressed. Therefore, such problems as spacing loss, tape damage and the like can be prevented, and the durability of magnetic tapes can be improved, thereby enhancing their reliability.

It should be understood by those skilled in the art that various modifications, combinations, sub-combinations and alterations may occur depending on design requirements and other factors insofar as they are within the scope of the appended claims or the equivalents thereof.

What is claimed is:

1. A magneto-resistive head, which uses a magneto-resistive element that measures magnetic fields through magneto-resistive effects, comprising:
   a thermally conductive member formed around the magneto-resistive element having a thermal conductivity greater than 20 W/m·K, wherein
   said magneto-resistive element is connected to said thermally conductive member, and wherein the material that forms said thermally conductive material comprises either of silicon nitride ceramics, aluminum nitride, or silicon carbide.

2. The magneto-resistive head according to claim 1, wherein said thermally conductive member forms an insulating protective layer that holds said magneto-resistive element.

3. A magnetic tape recording/reproducing system, comprising:
   a magnetic tape having a layered structure where a magnetic layer is formed on a base film, and a lubricant layer for reducing friction is formed as a top-most layer; and a magneto-resistive head that uses a magneto-resistive element that measures magnetic field of said magnetic layer through magneto-resistive effects which is surrounded by a thermally conductive material that also surrounds shield member located adjacent the magneto-resistive element, wherein and further wherein the material that forms said thermally conductive material comprises either of silicon nitride ceramics, aluminum nitride, or silicon carbide.

4. The magnetic tape recording/reproducing system according to claim 3, wherein said magneto-resistive head comprises a thermally conductive member having a thermal conductivity greater than 20 W/m·K, and said magneto-resistive element and said thermally conductive member are connected.

5. The magnetic tape recording/reproducing system according to claim 3, wherein said magnetic tape is one in which said magnetic layer is formed by depositing a magnetic material on said base film through evaporation.

* * * * *